F. H. RICHARDS.
EXPANSION JOINT.
APPLICATION FILED AUG. 4, 1916. RENEWED JUNE 15, 1918.
1,292,060.
Patented Jan. 21, 1919.
3 SHEETS—SHEET 2.
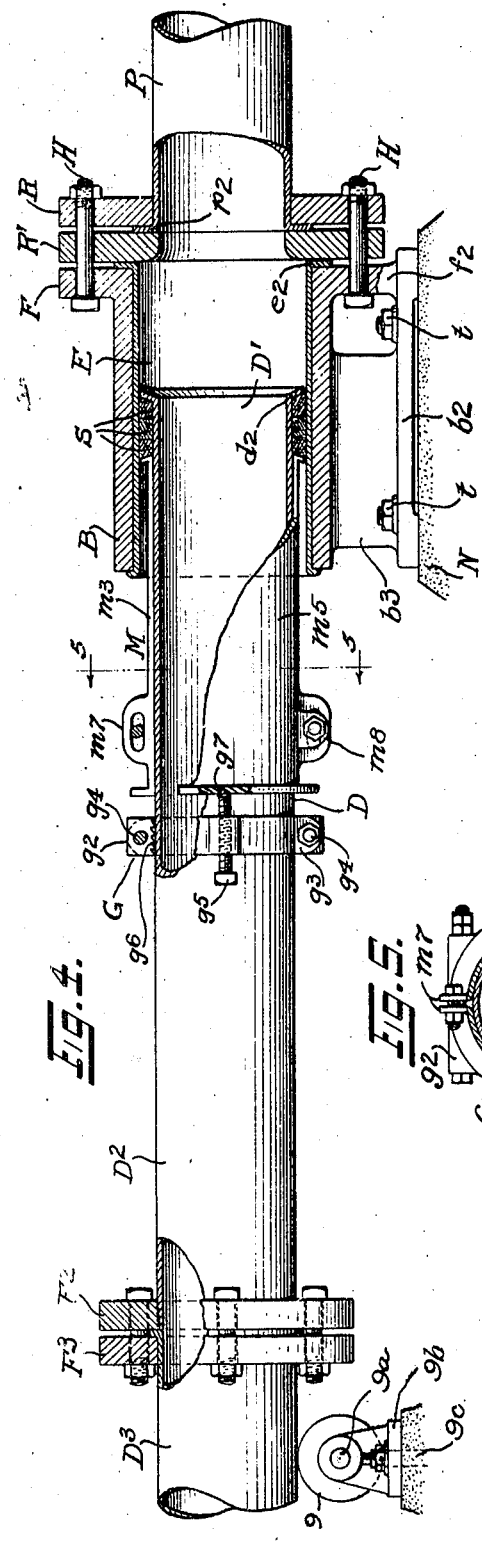
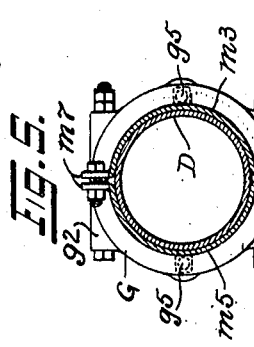
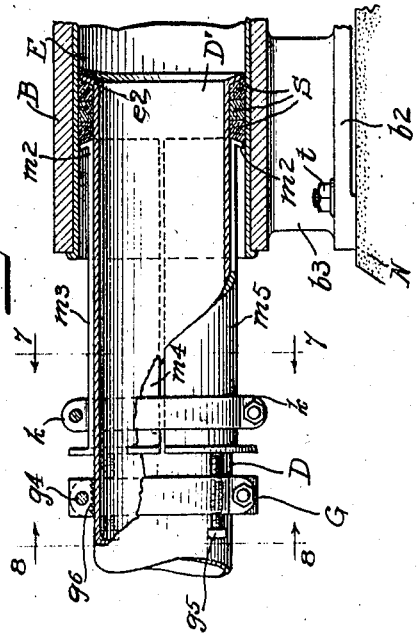
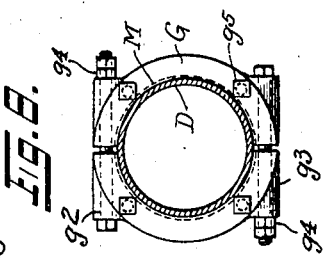
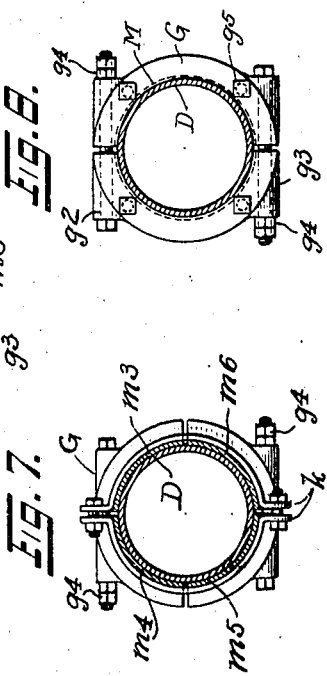
Inventor:
Francis H Richards F. H. RICHARDS.
EXPANSION JOINT.
APPLICATION FILED AUG. 4, 1916. RENEWED JUNE 15, 1918.
1,292,060.
Patented Jan. 21, 1919.
3 SHEETS—SHEET 3.
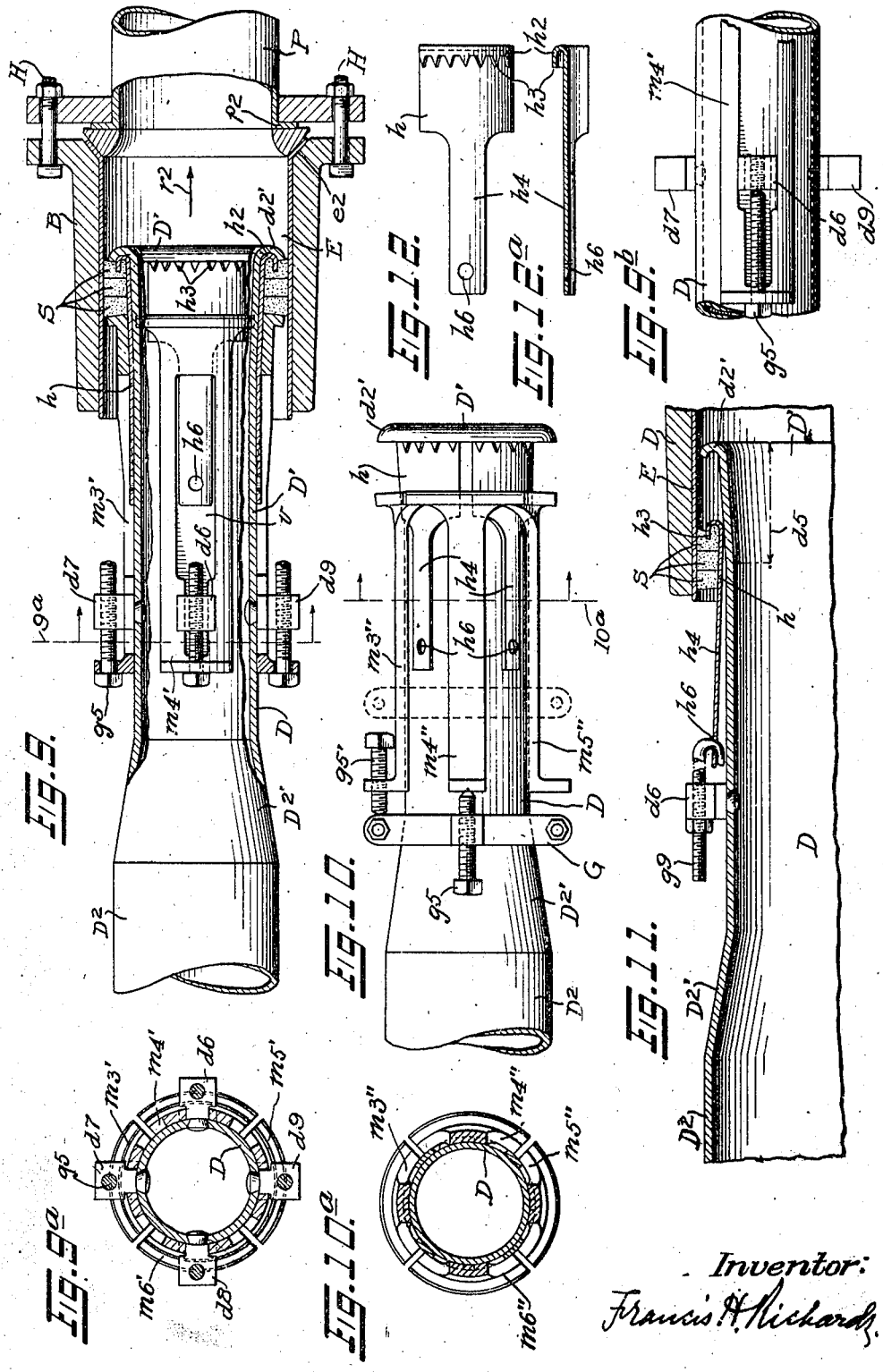
Inventor:
Francis H. Richards

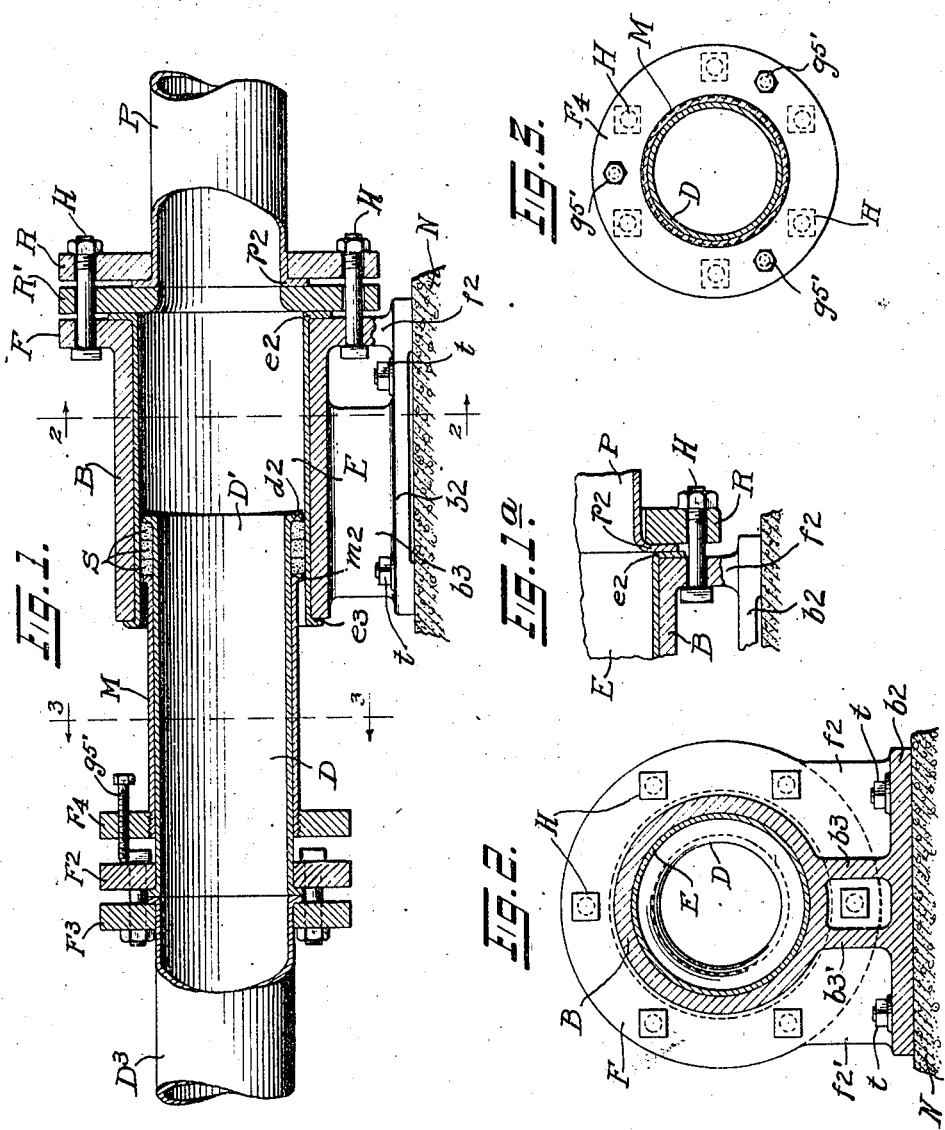

UNITED STATES PATENT OFFICE.

FRANCIS H. RICHARDS, OF HARTFORD, CONNECTICUT, ASSIGNOR TO SCOTT C. ROSS, OF BUFFALO, NEW YORK.

EXPANSION-JOINT.

1,292,060.                     Specification of Letters Patent.     Patented Jan. 21, 1919.

Application filed August 4, 1916, Serial No. 113,041. Renewed June 15, 1918. Serial No. 240,249.

*To all whom it may concern:*

Be it known that I, FRANCIS H. RICHARDS, a citizen of the United States, residing in Hartford, in the county of Hartford and State of Connecticut, have invented certain new and useful Improvements in Expansion-Joints, of which the following is a specification.

A principal object of my present invention is to furnish an expansion joint suitable for use in pipe lines for heating plants and for conveying water or other liquids in large quantities and of varying temperatures, and in which the packing may be readily adjusted as regards tightness or compression without the removal of any members of the apparatus.

A further object is to provide a packing and compressing appliances therefor so arranged as not to require any guiding means other than such as ordinarily used for supporting the pipe line in an approximately true position. Other features of the improvement relate to packing compressing appliances so organized as to be removable from and replaceable in working position without requiring any part or pipe-length of the pipe line to be disconnected, nor any section of the line to be removed.

A further feature relates to a means and construction whereby a relatively thin brass lining may be applied in the packing cylinder in such a manner as to secure a high degree of accuracy and efficiency while requiring a minimum amount of the more expensive metal, and at the same time provide for readily repairing and renewing the lining whenever required.

In the drawings accompanying and forming a part of this specification, Figure 1 is a side elevation, drawn largely in section, for illustrating the principal features of my present invention in one of the more simple arrangements thereof.

Fig. 1ª illustrates a modified arrangement of one of the details as hereinafter more fully explained.

Fig. 2 is a cross sectional view in line 2—2 of Fig. 1, showing the parts at the right hand of said line as seen from a point at the left hand thereof.

Fig. 3 is a cross sectional view in line 3—3 of Fig. 1, showing the parts at the left hand of said line as seen from a point at the right hand thereof.

Fig. 4 is a view similar to Fig. 1 and illustrates a more complete embodiment of the present improvements.

Fig. 5 is a cross sectional view on line 5—5 of Fig. 4, for showing the parts immediately at the left of said line as seen from a point at the right hand thereof.

Fig. 6 is a view similar to a portion of Fig. 4 for further illustrating the packing device or mechanism.

Fig. 7 is a cross sectional view in line 7—7 of Fig. 6, and shows the parts at the left hand of said line as seen from a point at the right hand thereof.

Fig. 8 is a sectional view in line 8—8 of Fig. 6, for showing the parts between said lines 7—7 and 8—8 as seen from a point at the left hand of said line 8—8.

Fig. 9 is a side elevation similar to Figs. 1 and 4, and showing the guide cylinder in longitudinal section and also showing the packing-carrying end of the coacting pipe line member broken away along the side portions thereof for more clearly illustrating certain details which are hereinafter more fully explained.

Fig. 9ª is a cross section taken on the line 9ª, Fig. 9, for showing the details immediately at the right hand of said line 9ª.

Fig. 9ᵇ is a fragmentary view corresponding to a portion of Fig. 9, and is illustrative of certain details and features of a preferred form of the packing compressing means when this is arranged for removal by a disassembling the same.

Fig. 10 is a side view corresponding to a portion of Fig. 9, for further illustrating the preferred means for holding, compressing and removing the packing.

Fig. 10ª is a cross section of line 10ª of Fig. 10, and shows the parts at the right hand of said line as seen from a point at the left hand thereof.

Fig. 11 is a fragmentary sectional view corresponding to a portion of Fig. 9, and is illustrative of one way of removing the packing without disassembling the principal pipe-line members.

Fig. 12 is a plan view and Fig. 12ª a longitudinal section of one of the series of packing extractor devices, which are further illustrated in Figs. 9 to 11.

Similar characters designate like parts in all of the views.

In Fig. 1, a series of pipe-line members, or pipe-lengths, are indicated by P, D and $D^3$, and the members P and D are shown having communication with each other through the cylinder B which for some but a variable part of its length is also a fluid conveyer. In Fig. 4, the same arrangement is shown with the additional feature that the pipe-end D is extended by a length $D^2$; this is for the purpose of providing a space wherein to withdraw the packing-compressing appliances,—which are arranged exteriorly of the member D,—to a position (not shown) entirely beyond the cylinder B. At its forward end D', the tube D is shown formed or turned outwardly into a packing-rim $d^2$, which is shown adapted and arranged to slide freely within the cylinder B the entire length thereof. In practice, the expansion joint should be so fitted up and adjusted that the rim $d^2$ will not contact with the inner face of the piston-chamber within the member B. The pipe-lengths D and $D^3$ may be connected by flanges, as $F^2$, $F^3$, and by bolts, in the well-known manner shown in Fig. 1. In this arrangement, the flange $F^2$ also may serve as an abutment ring against which the presser-actuating screws, as $g^{5\prime}$, may act; these screws,—one or more of them, as may be found desirable,—may be threaded into a flange,—as $F^4$, Fig. 1,—of the compressor-member M. In Fig. 1, the flange $F^4$ is shown screwed onto the tube M, but other modes and forms of attachment may be used, also said flange and tube may be made integral, this being in accordance with the arrangements of details in Figs. 4 and 9. In the several arrangements described, it will be noted that the slidable pipe-line member,—as D, Fig. 1, and D', Figs. 4 and 9,—is shown to be unguided as to alinement, for which purpose this member is made small enough so that a clear space is left between the several pressers and the interior surface of the cylinder lining E.

The casing or cylinder B is shown in Figs. 1, 2, 4, and 6, as being provided with a base-plate, $b^2$, connected with the cylinder proper by means of the walls $b^3$, $b^{3\prime}$, and the extensions $f^2$, $f^{2\prime}$, (Figs. 1, 2 and 4) of the said cylinder flange F. In practice, however, such supporting means may be omitted whenever the manner of installing the pipe line does not require the same. When provided with the base $b^2$, the cylinder B and said base and connecting parts constitute a combined cylinder and casing which is also a bracket or frame-member suitable for being bolted,—as by anchorage bolts $t$, $t$,—upon some substantial foundation, as indicated at N,—for instance, which usually may be stone or concrete.

This construction and arrangement of the casing-member B provides for utilizing the entire length of this member for the interior cylinder-surface on which the packed-end D' of the slidable pipe-length, as D or $D^2$, may slide. Thus the entire length of the interior of the member B constitutes a piston-chamber, in which said packed-end D' slides after the manner of an engine piston sliding in an ordinary engine cylinder; hence, for convenience this piston-chamber is termed the "cylinder", but it should be understood that the interior surface need not be truly circular in section,—although usually more conveniently made of that form,—but may be somewhat elliptical, or even polygonal, in cross sectional outline, and still be "a cylinder" within the meaning of this term as herein employed, since such a variation (not shown) does not materially modify or change the mode of operation.

The pipe line section P, shown at the right hand in Figs. 1 and 4, may be connected with the packing cylinder B in any suitable or convenient manner. In the present instance I have shown said pipe P provided with the outwardly turned flange $P^2$, which may be clamped between the two rings R and R' for securing the required tightness of the joints. As one suitable means for securing said clamp rings to the cylinder B, this cylinder may be provided with a flange F, so that the holding bolts, as H, H, may draw the outer ring R against the pipe flange $p^2$, and thus draw the middle ring R' against the outwardly turned end $e^2$ of the cylinder lining E; the mode of operation of these various details will be evident from a comparison of the several views in which the same are illustrated. In practice, however, the said middle ring R', in some instances, may be omitted, and the pipe flange F, (being made of suitable size therefor) may be drawn against the lining flange $e^2$ in a manner which will be obvious without further description. This modification of the pipe-and-cylinder connection is indicated in Fig. 1ª, where the pipe-flange $e^2$ bears directly against the lining flange $p^2$, thus eliminating any need for the intermediate ring R' of Figs. 1 and 4. Whenever found to be desirable, of course, a layer of sheet-form packing material of any suitable kind, may be inserted between the pairs of directly coacting faces of the several aforesaid rings and flanges, in accordance with an ordinary practice well-known in this art, and hence such layers, packing or materials are not shown in the drawings.

In practice, the cylinder B will usually be made of cast iron for low pressure and of cast steel for high pressure pipe-lines, and should be bored for truly sizing the same throughout its length, but owing to the use of the lining-tube, it is not necessary for the cylinder surface to be smooth, or otherwise perfect in character. The lining-tube E will usually and preferably be made of brass or such other alloy-metal as may be suitable for use in connection with the fluids which, in any particular instance, are to be transmitted through the pipe-line. The lining-tube being provided of suitable size to slide into the cylinder B, and having been previously shaped or spun outwardly to form a holding flange, as $e^2$, this tube may then be expanded into the cylinder B in a well-known manner by spinning or rolling the same with a suitable tool, (not shown). In this way, or in other suitable manner, the lining-tube E, may be firmly seated or fitted within said cylinder. After this is done,— the lining-tube having been first made of suitable length therefor,—the outer end (at the left-hand in Fig. 1), may be spun over at $e^3$ to engage against the end of the cylinder B and thus form a smooth and bead-like corner. In some instances, however,—and whenever desired,—said end-finish at $e^3$ may be omitted. Also, and preferably in many cases, said lining-tube may be fitted closely but freely within the cylinder B so that,— being held by its end flange $e^2$ clamped in position as described,—the said lining-tube will be free to slide within the cylinder B to the extent of the difference in longitudinal expansion, by changes in temperature, due to the kinds of metal of which said lining-tube and said cylinder B, respectively, are made; this slidable arrangement of the lining-tube is deemed to be preferable whenever the expansion joint shall be constructed to provide for a relatively long movement or working stroke. An instance of this kind is found in heating plants where the water is intermittently raised from a low temperature to unusually high temperatures, and especially when such pipe-lines are of a considerable length between the expansion-joints and the usual coacting anchorages.

The cylinder B, or the lining thereof, as E, when this cylinder is provided with a lining tube, constitutes one part, or length,— however short this may be,—of the line of pipe itself, and therefore is one of the tubular fluid-conveying components of the connected series of pipe-lengths within and against the inner surface of which the fluid is passed along. Thus the cylinder B is a component part of the pipe-line considered as a conduit, and not a guide-member applied to such a line which is otherwise complete as a conduit. When the lining-tube is employed, this tube constitutes the guide-surface member, and a piston-chamber member of the pipe-line, while the outer member B serves as a strengthening member or frame therefor, and also, usually, constitutes a part of the means for connecting said tube-member, as E, to the adjacent component, as P, of the pipe-line. The construction here set forth has an exceptional utility in expansion joints, since the lining E may be made of drawn metal which is thus given a smooth surface, while the inside of the cylinder B needs, in practice, to be merely trued up in the machining operation, without requiring to be made smooth enough for the packing rings to slide thereon; thus the said boring operation is greatly reduced in cost; also, a pitting of the casting which would ordinarily spoil the inner surface thereof, is now rendered of no effect, thus largely reducing the foundry costs and losses usual in the manufacture of this class of expansion joints.

Pipe lines of the class for which my present improvements are especially applicable are usually installed by placing the expansion joint thereof upon a suitable foundation,— diagrammatically indicated at N,—while the successive sections or lengths of the line are supported by one or more rollers in a well-known manner. In Fig. 4 such a roller is indicated at 9, and is shown placed and arranged for supporting the pipe-line section $D^3$. The roller 9 is shown supported in a usual manner upon a pin $9^a$ mounted in an ordinary support or roller-frame $9^b$, which may be set upon some suitable bracket or foundation as $9^c$, depending upon the location and arrangement of the pipe line.

Upon the forward part of the pipe-end D, suitable packing, preferably in the usual form of rings, as S, moldable as usual by compression, are placed contiguous to the rim $d^2$, and for properly compressing such packing, and for regulating such compression, an improved means therefor is provided, which I designate as the "packing-compressor". One feature of this packing-compressor is the arrangement thereof in the form,—in a general way,—of a sleeve, as M, disposed externally of the pipe-end D, and arranged for the forward end thereof,—as at $m^2$, to bear against the packing S, while the length of the compressor is sufficient to bring the rearward end thereof always beyond or outside of the cylinder B. In some instances this compressor sleeve may be a plain tube, slipped over the tube D before the usual rearward flange or ring is fixed or formed thereon, or, in other cases, before the forward end, $d^2$, is formed thereon. But I prefer to make said compressor of a composite construction, so that it comprises a plurality of segments, or stave-like members which are preferably of a duplicate character, and so arranged that the compressor on being drawn out of the cylinder may be readily removed by disassembling from the pipe-end D. A further feature relates to the construction and organization of the said compressor members in such a manner that these members may be removed and replaced separately, and also each be adjustable by some separately-operable means, of which some preferred arrangements are herein illustrated and described.

In Figs. 1 and 3, the packing-compressor, M, is shown formed of a tube slidable outside of the pipe D, but in Figs. 4 and 5, this member, M, is shown divided into the two longitudinally disposed presser members, $m^3$, $m^5$, while in Figs. 6 and 7, the said compressor member is divided into four similar segmental parts, or pressers, $m^3$, $m^4$, $m^5$, $m^6$. Thus the device M may be said to be made up or composed, in some instances, of a series of members $m$, these being separately distinguished by exponents—figures as above indicated. Also, in some of the views, modified or special forms of the members $m$, are indicated by the position of prime and double-prime marks, as for instance, in Figs. 9 and 10, respectively.

In Figs. 4 and 5, the presser members $m^3$, $m^5$, are shown held assembled in proper position on the pipe member D, by means of pairs of ordinary ears or flanges at $m^7$, $m^8$, (with holding bolts as shown) so arranged as to allow said two pressers to be separately actuated by the screws $g^5$, or such other well-known or suitable actuating means as may be adapted for that purpose.

In all of the principal views the presser members are shown extending outwardly from the cylinder B to a length greater than the normal stroke in said cylinder of the packing rings S, so that the outer end of said packing-regulating means will always be located outside of the cylinder and thus be readily accessible whenever required and regardless of the degree of expansion to which the pipe line, as $D^2$, $D^3$, may have been subjected by heat. The actuating means whereby to operate the longitudinally disposed segmental presser members, as shown in Figs. 4 to 8 inclusive, comprises an abutment ring G which (as shown in Fig. 8) may consist of two parts $g^2$, $g^3$, held together by bolts $g^4$, in an ordinary manner, and may be provided with screws as $g^5$ whereby to force the several presser members against the packing. In the sectional views Figs. 4 and 6 said abutment ring G is shown provided upon the inner side thereof with teeth at $g^6$, as one means whereby to releasably locate said abutment member on the pipe D with a sufficient adhesion or degree of engagement for preventing the resistance of the packing from forcing said abutment ring rearwardly on the pipe-line. When occasion requires the rearward, or outer, ends of the said presser members may be retained in proper engagement with the pipe D by means of a light band as $k$, made in two parts and held together by bolts, in the manner which is shown in the drawings. In some cases said retaining band $k$ may be omitted especially when the set screws $g^5$, as in Fig. 4, are each made to have the point thereof engage in a recess formed at $g^7$ in the rearward end of the presser member.

When the packing regulating or compressor apparatus or device is arranged with a removable abutment ring as a portion thereof, (as shown for instance in Fig. 4), and when such an abutment ring, as G, is to be employed in the form of pipe line mechanism shown in Fig. 10, said abutment ring may be located on the forward part of the tapering portion $D^{2'}$, so that the tapered outer surface of said conical portion of the pipe line member will furnish a support for said ring whereby to resist the action of the operating screws of the packing compressor and thereby positively prevent the abutment ring from being slid backwardly on the pipe line. When this arrangement is employed and the workman is about to remove the compressor segments, he will ordinarily first remove said abutment ring by unclamping the same and taking it apart in the usual manner of removing ordinary clamp-collars and analogous devices. In practice the actuating screws, as $g^5$, may be threaded through said removable ring, G, and thus press forwardly against the rearward end of the compressor segments (as indicated at $g^5$, Fig. 10); or, said screws in some cases may be reversely arranged and the thread thereof engage with a nut formed in the rearward and outwardly-turned end of the compressor member, while the point of the screw bears against said abutment ring, as shown for instance at $g^{5'}$, Fig. 10; this is also in accordance with the arrangement shown in Fig. 1.

In the more complete form thereof illustrated in Figs. 9 to $12^a$, the packing compressor apparatus is shown used in combination with a packing extractor means whereby,—on removal of the several component members of said compressor,—the packing may be forcibly dragged out from between the pipe-end D' and the inner surface of the cylinder lining E. While this packing extractor may have, in practice, various specific forms and arrangements, I prefer to arrange the same in about the same manner shown in plan view in Fig. 10, and in longitudinal or side view, in Fig. $12^a$. This packing extractor may be described as consisting of a relatively thin annular member, which preferably, may be formed in two or more segments, also it is preferably made of some metal not readily oxidizable. In Fig. 9, such a metal layer, $h$, is indicated in position between the pipe end D' and the ring of packing material S. On the right hand said extractor plate or device is shown turned over at $h^2$ and provided with outwardly projecting hooks, as $h^3$ (Figs. 9, 10, 11 and 12) so arranged that when the packing material is forced forwardly (toward the right hand), such material will be forced over and engage said hooks, and bear against the outwardly turned rim or packing abutment $d^{2\prime}$ of said pipe end $D'$. On the left of the packing ring said extractor plate is shown formed with extensions, $h^4$ which may be of a width and length suitable for lying within the longitudinal space $v$ of the compressor segment $m^{1\prime}$, as best shown in Figs. 9 and $9^b$. One object of this arrangement is that on the removal of said compressor segment the projecting portion $h^4$ of the extractor may be used as a handle by means of which to draw the extractor outwardly and thus drag out the packing material from within the cylinder B. To facilitate this purpose said stem or handle portion may be provided with means for engaging the same, as for instance a hole formed therein at $h^5$, into which the hook of a bolt, as $g^9$ (Fig. 11) may be engaged, the threaded stem of the bolt being slipped through the stud or ear $d^8$ of the pipe end D, so that by screwing up a nut,—shown on the said bolt,—this bolt, together with the extractor device, may be pulled backwardly upon the pipe end $D'$. Thus the said bolt $g^9$ operates as a form of screw-jack whereby to apply great force to the packing for starting the same out of its working position (Fig. 9) at the forward end of the pipe line member D, to a retracted position, as in Fig. 11. To facilitate this operation, the forward portion, $d^5$, (Fig. 11), of the pipe end D, is shown formed somewhat tapering, so that when the packing S is being drawn out, it will become released from pressure in a direction diametrically of the pipe, and thus be more readily removed and replaced.

As a means for considerably reducing the endwise pressure on the pipe-line, due to the difference in internal diameter of the tube-end $D'$ relatively to the lining tube E, advantage may be taken of the well-known principle, (an instance of which is found in the "Venturi meter"), that in a long pipe in which a large volume of fluid is moving steadily, a short length of the pipe may be considerably reduced in size without materially increasing the resistance to the forward flow of the fluid. Accordingly, in Fig. 9, the pipe-lengths P and $D^2$ are shown nearly as large in diameter as the lining tube E, while the short pipe-length, or tube-end, $D'$, is reduced to a relatively smaller size. Thus the cross-sectional area of the piston-chamber within the member B,—which, of course, determines the end pressure upon the pipe $D^2$,—may be little if any more than such area of the pipe-lengths $D^2$ and P. The pipe-lengths D and $D^2$ should be joined (preferably integrally) by a tapering connecting portion, as $D^{2\prime}$, and, in practice, it is deemed to be preferable to arrange the expansion joint for the current to flow in the direction indicated by the arrow $r^2$. By reason of the described reduction of diameter of the member D, of course this member may be made somewhat thinner than otherwise proper, for thus securing a relatively greater elasticity thereof for the purposes here set forth. The features specially described in this paragraph, and involving the "Venturi" construction, although disclosed herein is not a part of the present invention but is included in the subject matter of a separate application, Serial No. 266,329, in which said subject matter is described and claimed.

As compared with the relatively rigid cylinder B, the relatively thin pipe-end $D'$, normally will be readily flexed, so that by reason of such elasticity, it will tend to conform to the packing ring S while this is being forced outwardly against the inside of the cylinder; and, obviously, the larger the diameter of the pipe D, relatively to the thickness of the pipe wall, the more easily will the end $D'$ adjust itself by such circumferential flexure to any inequalities in the quantities of material in the packing ring at different points in the circumference thereof. Thus, throughout the circuit of said packing, the pipe-end, $D'$, is diametrically self-adjusting since it is yielding, inwardly or outwardly, as the case may be, (under the usual forces and pressures, and through the distance required) for bringing all parts of the circumference thereof to evenly hold the packing material in proper contact with the cylinder, and thereby compensate not only for some inequality in the initial distribution of the packing material, but also for the changing distribution due to the wearing away of the material more in some parts than in other parts of the circumference by long continued use. By reason of these features and qualities, the packed pipe-end operates in such a perfect manner that, in practice, no machining of the surfaces thereof will ordinarily be required, thus effecting an important saving in cost of construction and maintenance.

The employment in connection with a member having therein a piston-chamber,— which member is preferably in the form of a cylinder, as B,—of the described flexible pipe-end, $D'$, carrying the packing externally thereon and provided with means for separately compressing the several circumferential portions of the packing, results in a combination of means peculiarly effective for properly packing the expansion joint not only when the pipes D and P are in accurate alinement, but also when these pipes become shifted considerably out of line, as often happens, for instance by the settling and shifting of foundations, or of floors in buildings. In practice, such a misalinement may be allowed to gradually accumulate to the extent of one-eighth or even (in some cases) to one-fourth of an inch per foot of length of the pipe-end D, without requiring a repair or resetting of the pipe line. This very important advantage is also secured while avoiding the use of all tubular sleeves sliding in stationary packings, and of all guiding devices therefor, such as a guided head or crosshead, or other analogous devices or means. Also, with reference to the two parts B and D, I avoid the use of any machined surface on one part arranged to engage or to slide upon a coacting machined surface on the other part. Thus while avoiding the use of those or any such expensive guiding appliances, my present improvements provide additional advantages having,—especially for use in some of the more exacting kinds of service,—a wider range of utility secured at a much less first cost.

Having thus described my invention, I claim:—

1. In an expansion joint of the class described, in combination, a guide-frame member having therein a piston-chamber, means for detachably securing the guide-frame and chamber to an adjacent pipe-line member, a coacting pipe-line member unguided as to alinement and having one end thereof provided with a packing applied externally thereon and adapted to slide in the piston-chamber, and means for separately compressing successive circumferential portions of the packing.

2. In an expansion joint of the class described, in combination, a fluid-conveying pipe-line member having therein a piston-chamber, a coacting pipe-line member unguided as to alinement and having one end thereof provided with a packing applied externally thereon and adapted to slide in the piston-chamber, and means for separately compressing successive circumferential portions of the packing.

3. In an expansion joint of the class described, in combination, a rigid guide-frame member having therein a piston-chamber, means for detachably securing the guide-frame and chamber to an adjacent pipe-line member, a coacting pipe-line member unguided as to alinement and relatively elastic diametrically as compared with the piston-chamber, and having one end thereof provided with a packing applied externally thereon and adapted to slide in the piston-chamber, and means for separately compressing successive circumferential portions of the packing.

4. In an expansion joint of the class described, in combination, a rigid fluid-conveying pipe-line member having therein a piston-chamber, and detachably securable to an adjacent pipe-line member, a coacting pipe-line member unguided as to alinement and relatively elastic diametrically as compared with said piston-chamber member, and having one end thereof provided with a packing applied externally thereon and adapted to slide in the piston-chamber, and means for separately compressing successive circumferential portions of the packing.

5. In an expansion joint of the class described, in combination, a fluid-conveying pipe-line member having a piston-chamber, a coacting pipe-line member unguided as to alinement and having one end thereof provided with a packing adapted to slide in the piston-chamber, and packing-regulating means comprising a series of pressers operable on successive circumferential portions, respectively, of the packing.

6. In an expansion joint of the class described, in combination, a rigid fluid-conveying pipe-line member having a piston-chamber, and detachably securable to an adjacent pipe-line member, a coacting pipe-line member unguided as to alinement and relatively elastic diametrically as compared with said piston-chamber member, and having one end thereof provided with a packing adapted to slide in the piston-chamber, and packing-regulating means comprising a series of segmental pressers operable on successive circumferential portions, respectively, of the packing.

7. In an expansion joint of the class described, in combination, a pipe line member having a piston-chamber, a coacting pipe-line member unguided as to alinement and having one end thereof provided with a packing adapted to slide in the piston-chamber, a series of pressers arranged in a circuit and operable upon successive circumferential portions of the packing, and means for separately actuating said pressers.

8. In an expansion joint of the class described, in combination, a pipe-line member having a piston-chamber, a coacting pipe-line member unguided as to alinement and having one end thereof provided with a packing adapted to slide in the piston-chamber, a series of pressers arranged in a circuit and operable upon successive circumferential portions of the packing, and means comprising screws and an abutment-ring for separately actuating said pressers.

9. In an expansion joint of the class described, in combination, a pipe-line member having a piston-chamber, a coacting slidable pipe-line member unguided as to alinement and having one end thereof provided with a packing applied externally thereon and adapted to slide in the piston-chamber, a packing-regulating apparatus comprising presser-members disposed longitudinally upon the slidable pipe-line member, and means for actuating said presser-members and carried externally on the pipe-line member in position always outside of said piston-chamber.

10. In an expansion joint of the class described, in combination, a pipe-line member having a piston-chamber, a coacting slidable pipe-line member unguided as to alinement and having one end thereof provided with a packing applied externally thereon and adapted to slide in the piston-chamber, packing-regulating apparatus comprising presser-members arranged in a circuit and removably secured upon the slidable pipe-line member, and means for separately actuating said presser-members.

11. In an expansion joint of the class described, in combination, a pipe-line member having a piston-chamber, a coacting slidable pipe-line member unguided as to alinement and having one end thereof provided with a packing applied externally thereon and adapted to slide in the piston-chamber, a packing-regulating apparatus comprising presser-members disposed longitudinally of and removably secured upon the slidable pipe-line member, and presser actuating means arranged for separately operating said presser-members and located externally on the slidable pipe-line member in position always outside of said piston-chamber.

12. In an expansion joint, in combination, a member having a piston-chamber, a coacting pipe-line member having one end thereof provided with a packing adapted to slide in the piston-chamber, a series of pressers arranged in a circuit and operable upon successive circumferential portions of the packing, means for actuating said pressers, and a packing-extractor coöperative with the pipe-line member and the pressers.

13. In an expansion joint, in combination, a member having a piston-chamber, a coacting pipe-line member having one end thereof provided with a packing adapted to slide in the piston-chamber, a series of pressers in a circuit and operable upon successive circumferential portions of the packing, means for actuating said pressers, and a packing-extractor coöperative with the pipe-line member and the pressers and having means whereby to remove the packing with the extractor subsequent to the removal of the pressers.

14. In an expansion joint, in combination, a pipe-line member having therein a piston-chamber, a slidable pipe-line member having one end thereof provided with a rim, a packing applied externally on the slidable pipe-line member and adapted to slide in the piston-chamber, packing-regulating apparatus comprising presser-members arranged in a circuit upon the slidable pipe-line member and coöperative with said rim, means for actuating said presser-members, and a packing-extractor comprising a series of members extending between the packing and said pipe-line member.

15. In an expansion joint, in combination, a member having therein a piston-chamber, a pipe having one end thereof provided with a rim, a packing applied externally on the pipe and coöperative with said rim and adapted to slide in the piston-chamber, packing-regulating apparatus arranged in a circuit upon the pipe, means for operating said apparatus, and a packing-extractor comprising a series of thin packing-engaging members each extending between the packing and said pipe.

16. In an expansion joint, in combination, a member having therein a piston-chamber, a slidable pipe having one end thereof provided with a rim, a packing applied externally on the slidable pipe and adapted to slide in the piston-chamber, packing-regulating apparatus arranged in a circuit upon the slidable pipe, means for operating the packing-regulating apparatus, and a packing-extractor comprising segmental members arranged in a circuit and extending between the packing and said pipe-line member and provided with an out-turned portion coöperative between said rim and the packing.

FRANCIS H. RICHARDS.

Witnesses:
  GEO. J. BARTELS,
  JOHN MORRIS.